(No Model.)
B. H. FOGG.
BICYCLE.
No. 575,152. Patented Jan. 12, 1897.
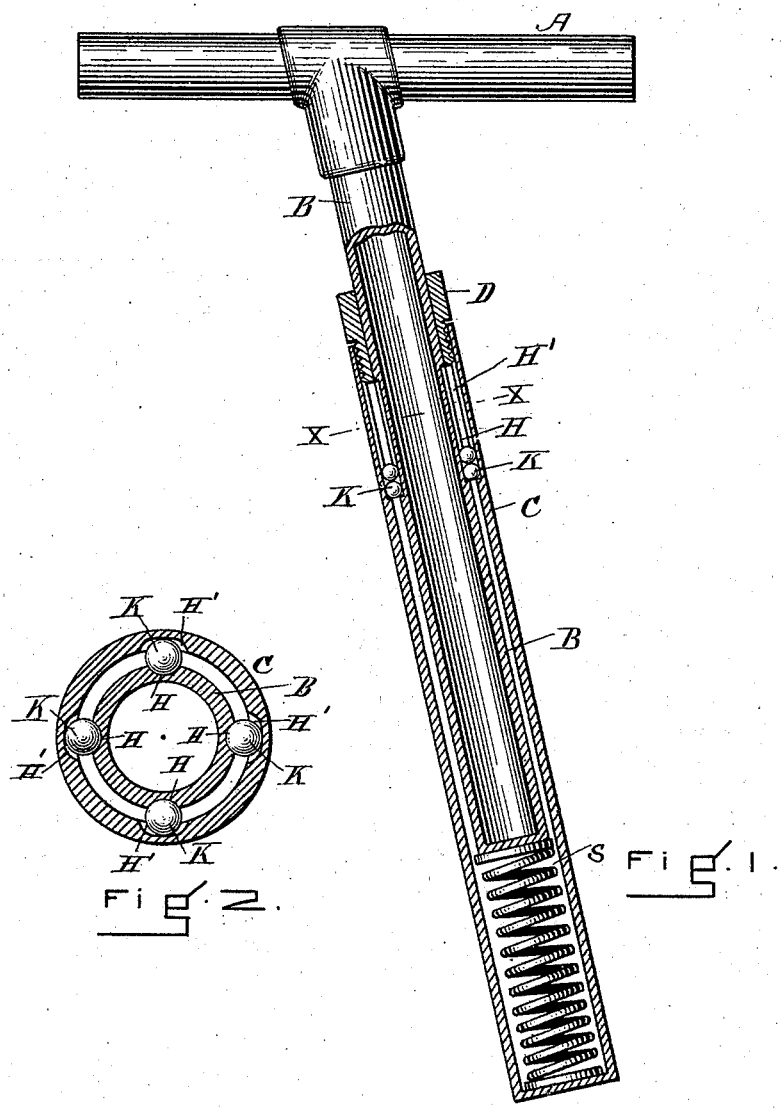

UNITED STATES PATENT OFFICE.

BERTON H. FOGG, OF SOMERVILLE, MASSACHUSETTS.

BICYCLE.

SPECIFICATION forming part of Letters Patent No. 575,152, dated January 12, 1897.

Application filed June 2, 1896. Serial No. 594,042. (No model.)

*To all whom it may concern:*

Be it known that I, BERTON H. FOGG, of Somerville, in the county of Middlesex and State of Massachusetts, have invented a new and useful Improvement in Bicycles, of which the following, taken in connection with the accompanying drawings, is a specification.

My invention relates to the mechanism for supporting the saddle of a bicycle; and it consists of a spring-support for the saddle-stem in combination with ball-bearings to diminish lateral friction and to limit and yet allow a slight horizontal oscillating movement of the saddle, whereby the user can ride with much more ease and comfort. The device is to be attached to the saddle-support member of the frame.

My invention is illustrated in the accompanying drawings, in which—

Figure 1 is a view, partly in elevation and partly in vertical section, showing the construction and arrangement of the parts in which my invention is involved. Fig. 2 is a cross-section taken on line X X of Fig. 1.

The cross-bar A is intended to represent the saddle-support, and B a hollow stem firmly connected to the bar A. The stem B has made in its outer surface a number of vertical grooves H H, which correspond with similar grooves H' H' in the interior surface of the part C. (More clearly indicated in the section, Fig. 2.) In the chambers formed by the grooves H H', I place balls K K, which serve to lessen the friction and allow the stem B to move up and down with the greatest freedom from friction. A spring S supports the stem B and allows the saddle to yield to the weight of the user and to relieve him from disagreeable joltings as the wheels pass over rough surfaces.

The slots or grooves H' H' are made somewhat wider than the diameter of the balls, so that the stem B can turn somewhat on its vertical axis, thus allowing the saddle to swing to a limited extent and thus accommodate itself to the movements of the rider in pedaling, and thus make it much easier and more comfortable to ride. By this arrangement a slight oscillating movement of the saddle is allowed, which admits of its adjustment to the movement of the legs of the user, so that the irregular and jolting movements of the front wheels are not communicated to the saddle and the rider feels no inconvenience from this.

D is a screw-follower, made as shown, and serves to hold the parts together and in place.

The tube indicated by C in the drawings is not a part of the bicycle-frame, but is intended to be attached to the saddle-support member of the frame.

I claim—

In a bicycle-saddle support the combination of a saddle-support having a grooved stem B, as described, and the supporting-spring S; with the tubular part C adapted to fit in the seat-supporting tube provided with interior grooves H' H' adapted to receive, in connection with the grooves H H, friction-balls, the said grooves H' H' being made of a width to admit of a slight lateral movement of the said friction-balls, substantially as and for the purpose set forth.

In testimony whereof I have signed my name to this specification, in the presence of two subscribing witnesses, on this 29th day of May, A. D. 1896.

BERTON H. FOGG.

Witnesses:
 FRANK G. PARKER,
 W. W. MEEK.